(12) United States Patent
Kawaguchi

(10) Patent No.: US 11,747,761 B2
(45) Date of Patent: Sep. 5, 2023

(54) INFORMATION PROCESSING APPARATUS AND CONTROL METHOD FOR AN IMAGE FORMING APPARATUS

(71) Applicant: CANON KABUSHIKI KAISHA, Tokyo (JP)

(72) Inventor: Daisuke Kawaguchi, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 20 days.

(21) Appl. No.: 17/397,657

(22) Filed: Aug. 9, 2021

(65) Prior Publication Data

US 2021/0364969 A1 Nov. 25, 2021

Related U.S. Application Data

(63) Continuation of application No. 16/708,889, filed on Dec. 10, 2019, now Pat. No. 11,119,431.

(30) Foreign Application Priority Data

Dec. 21, 2018 (JP) ................................. 2018-239882

(51) Int. Cl.
*G03G 15/00* (2006.01)
*G06F 3/12* (2006.01)

(52) U.S. Cl.
CPC ......... *G03G 15/556* (2013.01); *G06F 3/1219* (2013.01); *G06F 3/1239* (2013.01); *G03G 2221/16* (2013.01)

(58) Field of Classification Search
CPC ... G03G 15/553; G03G 15/556; G06F 3/1219
See application file for complete search history.

(56) References Cited

U.S. PATENT DOCUMENTS 6,295,423 B1 9/2001 Haines et al. ............ B41J 2/175
6,591,070 B1 7/2003 Shoji et al. ............. G03G 15/08
(Continued)

FOREIGN PATENT DOCUMENTS

JP 2001-201932 7/2001
JP 2005-503937 2/2005
(Continued)

OTHER PUBLICATIONS

Office Action dated Sep. 27, 2022 in counterpart Japanese Application No. 2018-239882, together with English translation thereof.

*Primary Examiner* — Benjamin R Schmitt
(74) *Attorney, Agent, or Firm* — Venable LLP

(57) ABSTRACT

An image forming apparatus including a consumable to be used for image formation. The image forming apparatus includes: a usage amount detector configured to detect a cumulative value of a usage amount of the consumable and a remaining amount of the consumable; a predictor configured to predict a period that allows use of the consumable based on the remaining amount detected by the usage amount detector; and a determination unit configured to generate a delivery request signal for prompting a delivery request for the consumable when the period that allows the use predicted by the predictor is smaller than a predetermined number-of-day threshold value. The image forming apparatus avoids performing processing for generating a delivery request signal by the determination unit after the start of the use of the image forming apparatus until a predetermined condition is satisfied.

16 Claims, 8 Drawing Sheets

(56) References Cited

U.S. PATENT DOCUMENTS

| | | | |
|---|---|---|---|
| 6,594,451 B2 | 7/2003 | Kakeshita et al. | 399/24 |
| 6,798,997 B1 | 9/2004 | Hayward et al. | 399/12 |
| 2001/0019343 A1 | 9/2001 | Walker et al. | B41J 2/175 |
| 2004/0114947 A1 | 6/2004 | Geleynse et al. | 399/31 |
| 2005/0254830 A1 | 11/2005 | Maeda | 399/10 |
| 2009/0220255 A1 | 9/2009 | Futamata et al. | 399/31 |
| 2016/0109825 A1 | 4/2016 | Webb et al. | G03G 15/08 |
| 2017/0061268 A1 | 3/2017 | Miyazawa | G06K 15/00 |
| 2019/0235434 A1 | 8/2019 | Kawaguchi et al. | G03G 15/00 |

FOREIGN PATENT DOCUMENTS

| | | |
|---|---|---|
| JP | 2005-138532 | 6/2005 |
| JP | 2008-083275 | 4/2008 |
| JP | 2014-091298 | 5/2014 |
| JP | 2017-037596 | 2/2017 |
| JP | 2017-047537 | 3/2017 |
| JP | 2019-132957 | 8/2019 |

INFORMATION PROCESSING APPARATUS AND CONTROL METHOD FOR AN IMAGE FORMING APPARATUS

This application is a continuation of application Ser. No. 16/708,889 filed Dec. 10, 2019, currently pending; and claims priority under 35 U.S.C. § 119 to Japan Application JP 2018-239882 filed in Japan on Dec. 21, 2018; and the contents of all of which are incorporated herein by reference as if set forth in full.

BACKGROUND OF THE INVENTION

Field of the Invention

The present disclosure relates to a technology for managing consumables of an image forming apparatus.

Description of the Related Art

An image forming apparatus forms an image on paper or other such sheet to output the image. Examples of such an image forming apparatus include: an electrophotographic printer; an inkjet printer; and a multifunction peripheral, a copying machine, and a facsimile machine, which are obtained by adding an image reading function to those apparatus. The image forming apparatus uses toner, ink, paper, or other such material to form an image through use of parts (for example, photosensitive member) involved in image formation. The toner, ink, paper, or other such materials are consumables to be consumed by the image formation. The photosensitive member or other such parts are consumables which exhibit less performance, as compared with their original performances, along with the progress of contaminations caused by toner or ink and abrasion of a rubbing portion during the image formation. The photosensitive member or other such consumables are set with parts life. In the image forming apparatus, normal image formation is adversely affected when the consumables are exhausted or when the parts reach their parts life.

In order to stably operate the image forming apparatus, the following is performed. That is, the image forming apparatus notifies a user to prepare consumables for replacement before the consumables are exhausted or the parts reach their lives. In response to this notification, the user procures the consumable, and at a timing at which the replenishment or replacement (hereinafter simply referred to as "replacement") of the consumable is required, promptly replaces the consumable. In Japanese Patent Application Laid-open No. 2017-037596, there is disclosed a technology for a consumable management system involving the procurement of the consumable. This system includes an image forming apparatus configured to request a delivery of the consumable when the actual remaining amount of the consumable falls below a reference remaining amount (threshold value). The reference remaining amount (threshold value) is determined from the predicted remaining amount of the consumable and the number of days required for the delivery of the consumable. The predicted remaining amount is calculated based on the user's past usage history of the consumable.

When a future demand forecast (predicted remaining amount) based on the user's past usage history of the consumable is calculated, processing for applying the demand forecast to a mathematical model obtained from the usage history is performed in general. However, in an initial stage in which the image forming apparatus is installed, an error caused in the demand forecast becomes larger due to the following two factors. The first factor is that usage in the initial stage of the installation is different from the user's normal usage. Examples of the usage different from the user's normal usage include test output involved in installation preparation work, and an increase in use opportunity due to the user's curiosity raised for novelty immediately after the installation. The second factor is that the past usage history (number of past usage history data items) to be applied to the mathematical model is short (small), which increases the influence of an error included in data when a new history data item is obtained.

For those reasons, an error occurs in the delivery timing due to an error in the demand forecast in the initial stage of the installation. As a result, there is a possibility that a consumable may be delivered earlier than an original timing at which the consumable is required to be replaced. This necessitates the user's long-term inventory management of a newly delivered consumable. Therefore, it is required to shorten a period for the inventory management of the newly delivered consumable by suppressing the error in the delivery timing.

SUMMARY OF THE INVENTION

An information processing apparatus, which is to be in communication with an image forming device configured to form an image, wherein the information processing apparatus comprising; a controller configured to: acquire a statistical value relating to an image forming operation in which the image forming device forms the image; acquire consumption data relating to a consumption amount of a consumable of the image forming device; generate, based on the consumption data, a model for determining a future change in remaining amount of the consumable; and determine, based on the model, information relating to a replacement timing at which the consumable is to be replaced, wherein the controller controls whether or not to determine the information based on the statistical value.

Further features of the present invention will become apparent from the following description of exemplary embodiments (with reference to the attached drawings).

DESCRIPTION OF THE EMBODIMENTS

Now, an information forming apparatus according to at least one embodiment of the present disclosure is described with reference to the drawings.

Configuration of Image Forming Apparatus

Figure 1:
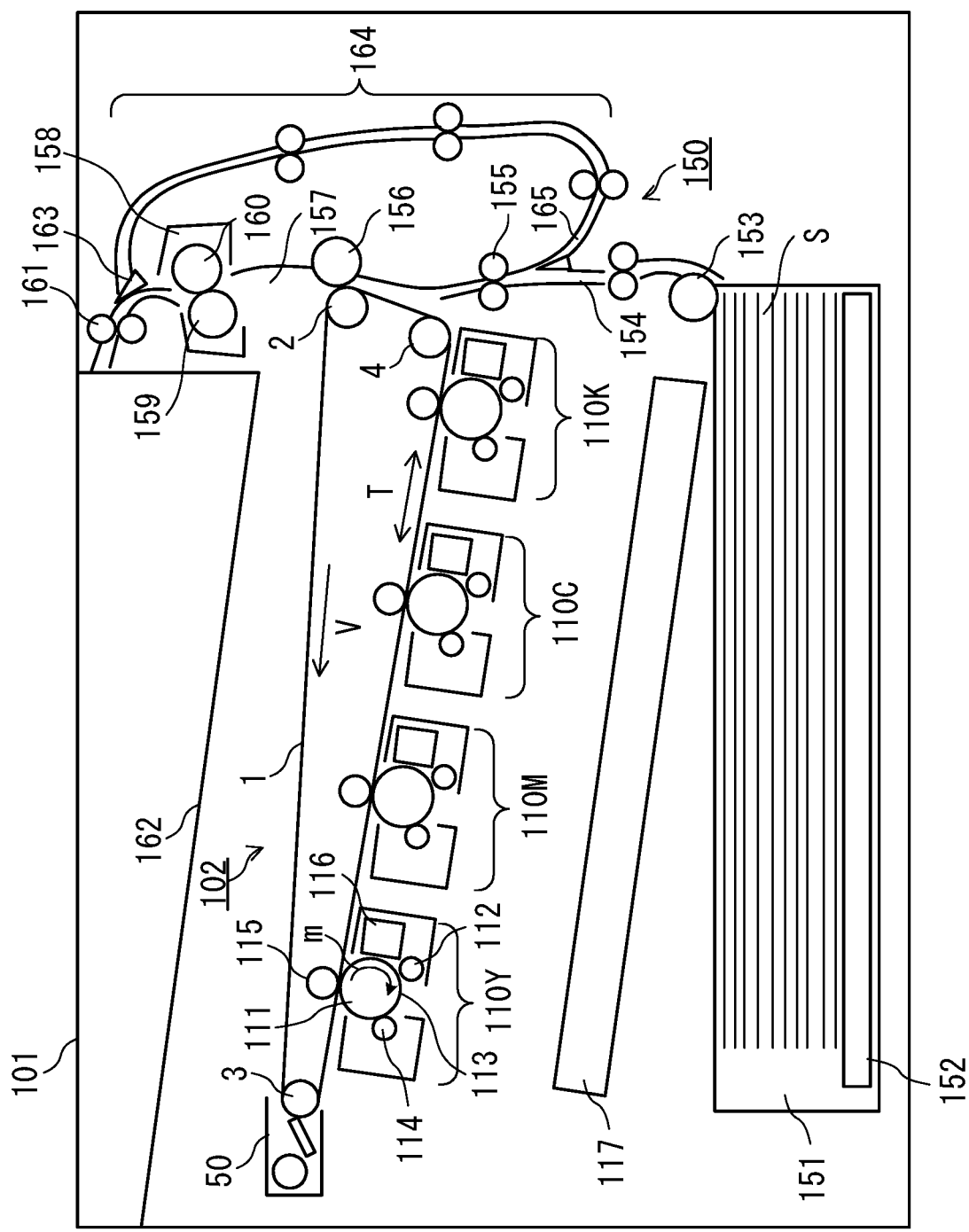
FIG. 1 is a configuration diagram of an image forming apparatus in at least one embodiment of the present disclosure.

FIG. 1 is a configuration diagram of an image forming apparatus in at least one embodiment of the present disclosure. An electrophotographic system, an offset printing system, and an inkjet system, and other such various systems can be applied to the image forming apparatus in at least one embodiment. The following description is directed to an image forming apparatus 101 using the electrophotographic system.

The image forming apparatus 101 employs an intermediate transfer tandem system, in which a plurality of image forming units 110Y, 110M, 110C, and 110K corresponding to four colors (yellow, magenta, cyan, and black) are arranged along an intermediate transfer belt 1. The symbols Y, M, C, and K at the end of the reference symbols represent yellow, magenta, cyan, and black, respectively. In the following description, the symbols Y, M, C, and K at the end of the reference symbols are omitted unless the description requires distinction between the colors. The image forming unit 110Y forms a yellow toner image. The image forming unit 110M forms a magenta toner image. The image forming unit 110C forms a cyan toner image. The image forming unit 110K forms a black toner image. The toner images of the respective colors are transferred from the image forming units 110Y, 110M, 110C, and 110K onto the intermediate transfer belt 1 so as to be superimposed one on another. The intermediate transfer belt 1 causes the toner images to be transferred onto a sheet S conveyed by a paper conveyor 150, to thereby form an image on the sheet S. The toner images transferred onto the sheet S are fixed to the sheet S by a fixing device 158.

Conveyance processing to be performed on the sheet S by the paper conveyor 150 is described. The sheets S are stored in a sheet storage unit 151, and are stacked on the lift-up unit 152. The sheet S is fed from the sheet storage unit 151 to a sheet feeding conveyance path 154 by a sheet feeding roller 153. The sheet feeding operation is started in accordance with an image forming timing for the image forming units 110Y, 110M, 110C, and 110K. The sheet S is conveyed along the sheet feeding conveyance path 154 to registration rollers 155. The registration rollers 155 correct the skew feed of the sheet S with respect to a conveyance direction, and adjust a timing to resume the conveyance to convey the sheet S to a secondary transfer portion. The secondary transfer portion is a transfer nip portion formed by a secondary transfer inner drive roller 2 and a secondary transfer outer drive roller 156, which are two transfer members arranged so as to be opposed to each other. The secondary transfer portion causes the toner images to be transferred from the intermediate transfer belt 1 onto the sheet S with a predetermined pressurizing force and a predetermined electrostatic load bias.

An image forming process for carrying the toner images to the secondary transfer portion in accordance with a timing at which the sheet S is conveyed to the secondary transfer portion is described. The image forming units 110Y, 110M, 110C, and 110K differ only in color of the toner image to be formed, and perform the same operation with the same configuration. The configuration and the operation of the image forming unit 110Y are described below. Descriptions of the other image forming units 110M, 110C, and 110K are omitted.

The image forming unit 110Y serving as a toner image forming unit includes a photosensitive member 111 being an image bearing member, a charging device 112, a developing device 114, a primary transfer roller 115, and a photosensitive member cleaner 116. In the vicinity of the image forming unit 110Y, a scanner unit 117 including a laser and a polygon mirror correction system lens are provided. The photosensitive member 111 has a drum shape, and is rotated in a direction indicated by the arrow m. The charging device 112 uniformly charges the surface of the photosensitive member 111 being rotated. The scanner unit 117 irradiates the charged surface (exposure unit 113) of the photosensitive member 111 with laser light modulated based on image pixel information (position or other such information on each of pixels forming the image) indicating an image to be formed. With this irradiation, an electrostatic latent image corresponding to the image pixel information is formed on the surface of the photosensitive member 111. The developing device 114 develops the electrostatic latent image formed on the photosensitive member 111 with electrostatically charged yellow toner (developer). With this development, a yellow toner image is formed on the photosensitive member 111. In the same manner, a magenta toner image is formed on the photosensitive member of the image forming unit 110M. A cyan toner image is formed on the photosensitive member of the image forming unit 110C. A black toner image is formed on the photosensitive member of the image forming unit 110K.

The primary transfer roller 115 transfers a yellow toner image from the photosensitive member 111 onto the intermediate transfer belt 1 with a predetermined pressurizing force and a predetermined electrostatic load bias. Transfer residual toner remaining on the photosensitive member 111 after the transfer is collected by the photosensitive member cleaner 116. The photosensitive member 111 prepares for the subsequent image formation by collecting the transfer residual toner. In the same manner, the magenta toner image formed on the photosensitive member of the image forming unit 110M, the cyan toner image formed on the photosensitive member of the image forming unit 110C, and the black toner formed on the photosensitive member of the image forming unit 110K are sequentially transferred onto the intermediate transfer belt 1 so as to be superposed on the yellow toner image.

As described above, the image forming processes for the respective colors are performed in parallel by the image forming units 110Y, 110M, 110C, and 110K. The image forming processes are performed by the respective image forming units 110Y, 110M, 110C, and 110K at timings at which the toner images of the respective colors are sequentially transferred onto the intermediate transfer belt 1 so as to be superimposed one on another. As a result, a full-color toner image is finally formed on the intermediate transfer belt 1. The full-color toner image is carried to the secondary transfer portion by the intermediate transfer belt 1. In at least one embodiment, the configuration for forming the toner images of the four colors of yellow, magenta, cyan, and black has been described, but the number of colors is not limited thereto. In addition, the arrangement of the image forming units 110 is not limited to the configuration illustrated in FIG. 1.

The intermediate transfer belt 1 is included in an intermediate transfer belt unit 102. The intermediate transfer belt unit 102 includes the secondary transfer inner drive roller 2, a tension roller 3, and a pre-secondary-transfer roller 4, around which the intermediate transfer belt 1 is stretched. The secondary transfer inner drive roller 2 serves both as a drive member and as a secondary transfer inner member. The tension roller 3 applies a predetermined tensile force to the intermediate transfer belt 1. The pre-secondary-transfer roller 4 is a tension member. The intermediate transfer belt 1 is a belt member to be driven to be conveyed in a direction indicated by the arrow V by the secondary transfer inner drive roller 2. The intermediate transfer belt 1 is driven to be conveyed to carry the toner images transferred from the respective image forming units 110 to the secondary transfer portion.

With respect to the conveyance direction of the intermediate transfer belt 1 indicated by the arrow V, the pre-secondary-transfer roller 4 is arranged on an upstream side of the secondary transfer inner drive roller 2, while the tension roller 3 is on a downstream side of the secondary transfer inner drive roller 2. The primary transfer rollers 115 for the respective image forming units 110 are arranged between the tension roller 3 and the pre-secondary-transfer roller 4. The tension roller 3 and the pre-secondary-transfer roller 4 are not applied with a drive force, and are rotated by following the conveyance of the intermediate transfer belt 1.

The tension roller 3 is movable in a direction indicated by the arrow T (direction of the intermediate transfer belt 1 looped around the tension roller 3 and the pre-secondary-transfer roller 4). The tension roller 3 is urged in a direction for applying a tensile force to the intermediate transfer belt 1 by an urging portion (not shown). The secondary transfer inner drive roller 2 has its outer peripheral surface made of conductive ethylene-propylene-diene rubber (EPDM). With this configuration, the secondary transfer inner drive roller 2 can convey the intermediate transfer belt 1 by a friction force under a state in which the tension roller 3 is applying a tensile force to the intermediate transfer belt 1. An initial frictional resistance μ of the outer peripheral surface of the secondary transfer inner drive roller 2 is set to from about 1.0 to about 1.5. The material of the secondary transfer inner drive roller 2 and the initial frictional resistance of the outer peripheral surface are not limited to those of the above-mentioned configuration. An intermediate transfer cleaner 50 configured to remove toner remaining on the intermediate transfer belt 1 is fixedly mounted to the tension roller 3 at a position opposed to the tension roller 3 across the intermediate transfer belt 1.

In at least one embodiment, the intermediate transfer belt 1 is an endless belt made of polyimide and having a circumferential length of 792 mm, a width of 346 mm, and a thickness of 60 μm. The material of the intermediate transfer belt 1 is not limited thereto, and an endless belt made of, for example, polycarbonate, PVDF, ETFE, or PTFE can be used. In addition, the number of rollers around which the intermediate transfer belt 1 is looped is not limited to that of the configuration illustrated in FIG. 1.

With such a configuration as described above, the sheet S is conveyed and the toner image is carried to the secondary transfer portion. The secondary transfer portion secondarily transfers the full-color toner image formed on the intermediate transfer belt 1 onto the sheet S. The sheet S onto which the toner image has been transferred is conveyed from the secondary transfer portion to the fixing device 158 through a pre-fixing conveyor 157.

The fixing device 158 has various configurations and systems. In at least one embodiment, the fixing device 158 includes a fixing roller 159 and a pressure roller 160, which are arranged so as to be opposed to each other. The fixing device 158 melts and fixes the toner image to the sheet S by applying a predetermined pressurizing force and a predetermined amount of heat to the sheet S within a fixing nip formed by the fixing roller 159 and the pressure roller 160. The fixing roller 159 includes a heater serving as a heat source in its inside. The pressure roller 160 is urged against the fixing roller 159.

The sheet S to which the image has been fixed is conveyed from the fixing device 158 to sheet delivery reversal rollers 161 or a duplex conveyance path 164 by a flapper 163. When the sheet S is to be delivered to a sheet delivery tray 162, the flapper 163 conveys the sheet S to the sheet delivery reversal rollers 161. When images are to be formed on both sides (double-sided printing), the flapper 163 temporarily conveys the sheet S to the sheet delivery reversal roller 161. After that, the sheet delivery reversal rollers 161 switch the leading end and the trailing end of the sheet S by performing a switch-back operation. Meanwhile, the flapper 163 is switched over, and guides the sheet S, which has the leading end and the trailing end switched, to the duplex conveyance path 164.

After that, the sheet S joins into the sheet feeding conveyance path 154 from a re-feed path 165 in synchronization with a sheet of the subsequent job conveyed from the sheet feeding roller 153, and an image is formed on the back side (second surface) of the sheet S. The sheet S is conveyed and the toner image is carried to the secondary transfer portion in the same manner as in the front side (first surface). The image forming process is performed on the back side (second surface) in the same manner as in the above-mentioned case of the front side (first surface).

Toner Replenishment of Developing Device from Toner Bottle

Figure 2:
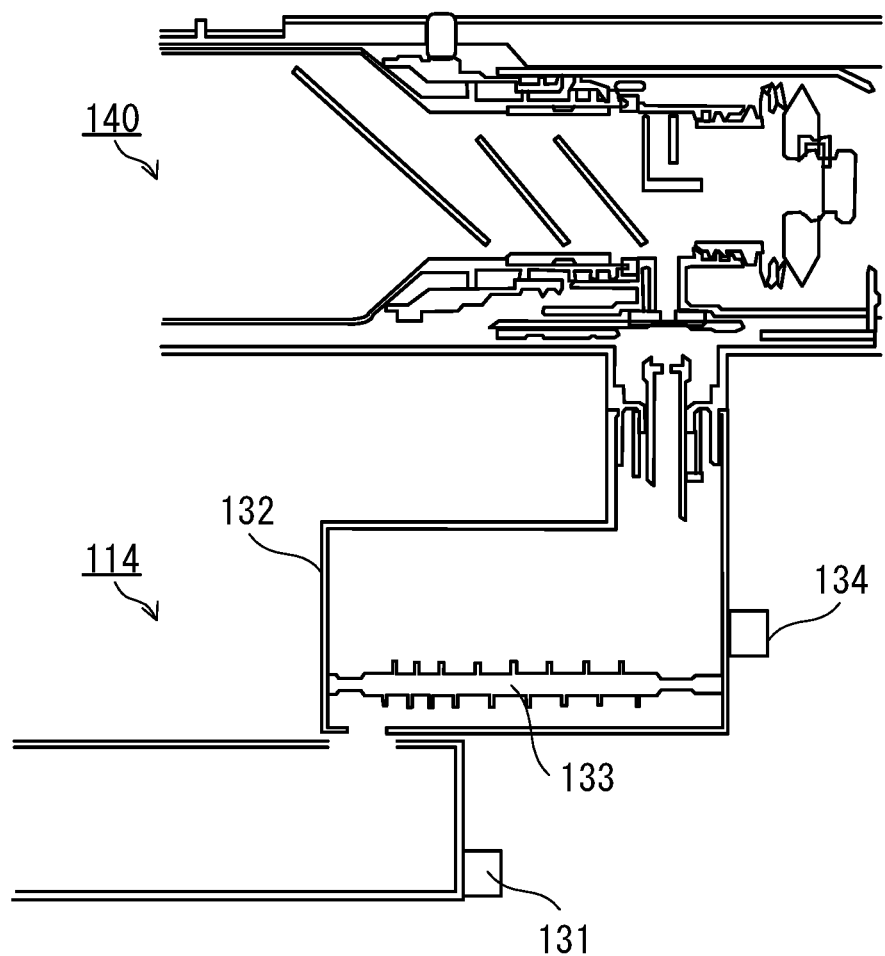
FIG. 2 is an explanatory diagram of an operation for replenishing toner.

FIG. 2 is an explanatory diagram of an operation for replenishing the developing device 114 with toner from a toner bottle. In the image forming process, the developing device 114 develops the electrostatic latent image with toner. The developing device 114 internally contains toner, and consumes toner being a consumable by a developing operation. This reduces the toner in the developing device 114 each time the image forming process is performed. Therefore, the developing device 114 is required to be replenished with toner from a toner bottle 140.

The developing device 114 includes a developing toner amount sensor 131 configured to detect the amount of the contained toner. The developing device 114 internally communicates to the toner bottle 140 through a hopper 132. When the amount of toner in the developing device 114 detected by the developing toner amount sensor 131 falls below a fixed amount, the developing device 114 is replenished with toner from the hopper 132. The hopper 132 internally includes a replenishing screw 133. Through the control of the rotation amount of the replenishing screw 133, the amount of toner to be supplied from the hopper 132 to the developing device 114 is maintained at a fixed amount.

When the amount of toner contained in the hopper 132 becomes equal to or smaller than a predetermined amount, the developing device 114 cannot be replenished with an accurate amount of toner from the hopper 132 irrespective of the rotation amount of the replenishing screw 133. The hopper 132 includes a hopper toner amount sensor 134 configured to detect the amount of the contained toner. When the amount of toner in the hopper 132 detected by the hopper toner amount sensor 134 falls below the fixed amount, the hopper 132 is replenished with toner from the toner bottle 140.

An inductance sensor configured to measure magnetic permeability or a powder level sensor using a piezoelectric vibrator can be used as each of the developing toner amount sensor 131 and the hopper toner amount sensor 134, for example. However, the present disclosure is not limited thereto.

The toner bottle 140 is removably attached to a mounting portion (not shown) provided to the image forming apparatus 101. A replenishment port of the toner bottle 140 has its replenishment port shutter opened when the toner bottle 140 is mounted to the mounting portion. The toner bottle 140 has a spiral toner conveyor formed in its inside. When an instruction to replenish the hopper 132 with toner is issued, the toner bottle 140 is rotated to convey the toner toward the replenishment port by the toner conveyor. Then, the hopper 132 is replenished with the toner in the toner bottle 140 from the replenishment port.

In this manner, the toner to be consumed by the developing device 114 is supplied from the toner bottle 140. Therefore, the toner in the toner bottle 140 decreases as the image forming process is further performed. The toner bottle 140 having a small amount of toner is replaced by a new toner bottle. This replacement allows the image forming apparatus 101 to continuously execute the image forming process.

Delivery Management of Consumable

Figure 3:
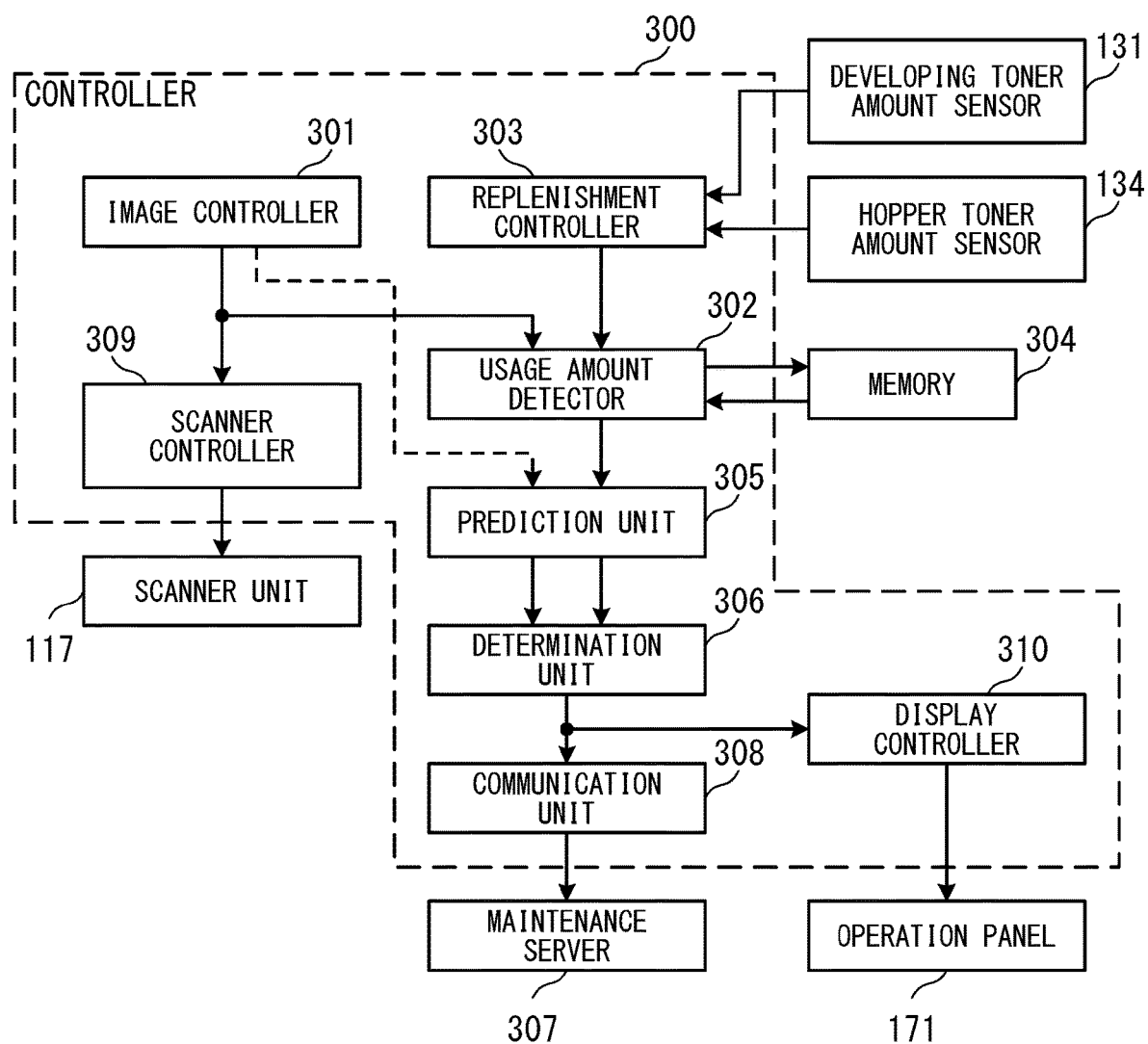
FIG. 3 is an explanatory diagram of a controller.

FIG. 3 is an explanatory diagram of a controller for performing delivery management of a consumable to be used by the image forming apparatus 101 at the time of image formation. A controller 300 is provided inside the image forming apparatus 101. A consumable is consumed by being used for image formation, and is parts for which parts life is set. The following description is directed to a case in which the consumable is toner. Other examples of the consumable include the sheet S, the photosensitive member 111, and the intermediate transfer belt 1.

The controller 300 is connected to the scanner unit 117, a memory 304, and an operation panel 171. The controller 300 is also connected to a maintenance server 307 through a public line or other such network so as to enable communication therebetween.

The memory 304 is provided to the toner bottle 140, and stores a remaining amount (remaining toner amount) of toner contained in the toner bottle 140. When the toner bottle 140 is unused, the memory 304 stores the amount of toner filled at the time of production as an initial value of the remaining toner amount. Information stored in the memory 304 may be, for example, the weight of the toner bottle, the number of revolutions of the toner bottle, and the number of times of the execution of the replenishment operation using the toner bottle, instead of the toner amount. The remaining toner amount stored in the memory 304 is managed by the controller 300 so as to be rewritable.

The operation panel 171 is a user interface that combines an input device including a key button and a touch panel and an output device including a display. The operation panel 171 is provided to the image forming apparatus 101, transmits an instruction or other such information to the controller 300, and displays an image on the display under the control of the controller 300.

The maintenance server 307 is an external server apparatus connected to the image forming apparatus 101 through a network, and includes a display configured to perform display corresponding to a signal received from the controller 300. The maintenance server 307 is installed in a maintenance service organization operated by the distributor of the image forming apparatus 101.

The controller 300 functions as an image controller 301, a usage amount detector 302, a replenishment controller 303, a prediction unit (predictor) 305, a determination unit (determiner) 306, a communication unit (communicator) 308, a scanner controller 309, and a display controller 310. Each of the functions of the controller 300 may be implemented by a central processing unit (CPU) executing a predetermined computer program, or may be executed by hardware. The controller 300 is formed of, for example, a micro processing unit (MPU), a system-on-a-chip (SoC), or an application specific integrated circuit (ASIC). The controller 300 functions as an information processing apparatus.

The image controller 301 transmits image pixel information to the scanner controller 309 and the usage amount detector 302. The scanner controller 309 generates a laser emission command corresponding to the image pixel information acquired from the image controller 301, and transmits the laser emission command to the scanner unit 117. The scanner unit 117 has its light emission timing controlled by the laser emission command. The image controller 301 also includes a counter configured to count the number of sheets S subjected to the image formation and output from the image forming apparatus 101. The image controller 301 notifies the prediction unit 305 of a cumulative output number $N_{PAGE}$ of the sheets S subjected to the image formation. The cumulative output number $N_{PAGE}$ is set to "0" at the time of the production of the image forming apparatus 101. In at least one embodiment, the cumulative output number $N_{PAGE}$ is the number of sheets (image formation number) converted in terms of A4-size sheets. For example, when an image is formed on A3-size sheets, the cumulative output number $N_{PAGE}$ is increased by two. The cumulative output number $N_{PAGE}$ functions as a statistical value relating to the image forming operation.

The replenishment controller 303 acquires a detection result of the amount of the toner in the developing device 114 obtained by the developing toner amount sensor 131 and a detection result of the amount of the toner in the hopper 132 obtained by the hopper toner amount sensor 134. The replenishment controller 303 determines the operation timings of the replenishing screw 133 and the toner bottle 140 based on those detection results. The replenishment controller 303 achieves the toner replenishment performed by the replenishing screw 133 and the toner bottle 140 by rotationally driving the motors for driving the replenishing screw 133 and the toner bottle 140 in accordance with the determined operation timings. The replenishment controller 303 counts the number of times of rotating the toner bottle 140 as a "toner replenishment count", and transmits the "toner replenishment count" to the usage amount detector 302 as a result of the counting.

Operations of the usage amount detector 302, the prediction unit 305, the determination unit 306, and the display controller 310 are described with reference to flow charts illustrated in FIG. 4 to FIG. 6.

Figure 4:
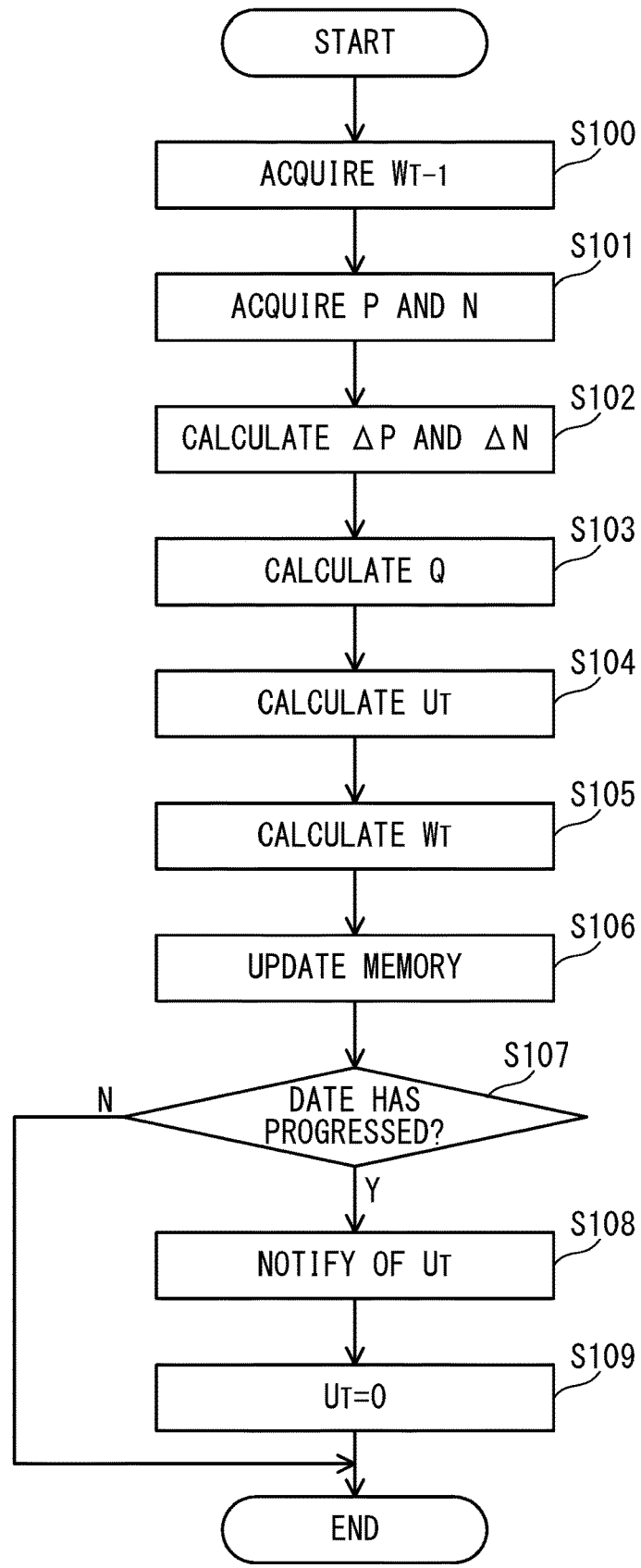
FIG. 4 is a flow chart for illustrating an operation of a usage amount detector.

FIG. 4 is a flow chart for illustrating the operation of the usage amount detector 302. The usage amount detector 302 executes the processing illustrated in FIG. 4 periodically (for example, every second) or irregularly (for example, each time an image is formed in a print unit of one image or one page).

The usage amount detector 302 acquires a remaining toner amount $W_{T-1}$ of the toner bottle 140 stored in the memory 304 (Step S100). The remaining toner amount $W_{T-1}$ is an example of remaining data on the remaining amount of the consumable. The remaining toner amount $W_{T-1}$ is the remaining toner amount detected and stored in the memory 304 in processing performed by the usage amount detector 302 last time (at a time "T−1" assuming that the current time is "T"). When the usage amount detector 302 first performs the processing illustrated in FIG. 4 after the toner bottle 140 is newly attached, the remaining toner amount $W_{T-1}$ is the amount of toner filled at the time of the production of the toner bottle 140, which is the initial value.

The usage amount detector 302 acquires image pixel information P from the image controller 301, and acquires a toner replenishment count N from the replenishment controller 303 (Step S101). The toner replenishment count N is an example of consumption data on the consumption amount of the consumable. In the same manner, the image pixel information P is an example of the consumption data on the consumption amount of the consumable. The image pixel information P represents a cumulative value of the number of pixels that have been subjected to the image formation to be output so far. The toner replenishment count N represents a cumulative value of the number of times that the toner bottle 140 has been rotated so far.

The usage amount detector 302 calculates ΔP being a result of subtracting the number of pixels indicated by image pixel information PT−1 acquired in the previous processing from the number of pixels indicated by the image pixel information P. In addition, the usage amount detector 302 calculates ΔN being a result of subtracting a toner replenishment count NT−1 acquired in the previous process from the toner replenishment count N (Step S102).

The usage amount detector 302 calculates an estimated amount (estimated usage amount Q) of toner estimated to be used at the current time T based on the calculated values of ΔP and ΔN, a representative value of a toner usage amount per pixel, and a representative value of a toner usage amount per time of toner replenishment (Step S103). The estimated usage amount Q is calculated by, for example, the following expression. The unit of the estimated usage amount Q is in milligrams.

$$Q=(0.015×\Delta P+180×\Delta N)/2$$

In this expression, the representative value of the toner usage amount per pixel is 0.015 mg, and the representative value of the toner usage amount per time of toner replenishment is 180 mg. This expression is a calculation expression for obtaining the estimated usage amount Q of the toner estimated to be used at the current time T through use of an average of the estimated toner usage amount based on the output image and the estimated toner usage amount based on a toner supply amount from the toner bottle 140.

The usage amount detector 302 calculates a cumulative value (cumulative toner usage amount) of the toner usage amount (Step S104). The usage amount detector 302 adds the estimated usage amount Q calculated in the current processing to a cumulative toner usage amount $U_{T-1}$ calculated in the previous processing (at the time (T−1)), to thereby calculate a cumulative toner usage amount $U_T$ at the current time T. That is, the usage amount detector 302 computes $U_T=U_{T-1}+Q$, where T is 1, 2, . . . , and U0 is 0.

The usage amount detector 302 calculates, as a remaining toner amount $W_T$ at the current time T, a result ($W_{T-1}$−Q) of subtracting the estimated usage amount Q from the remaining toner amount $W_{T-1}$ acquired from the memory 304 in the processing of Step S100 (Step S105). The usage amount detector 302 updates the remaining toner amount $W_{T-1}$ stored in the memory 304 to the calculated remaining toner amount $W_T$ (Step S106).

The usage amount detector 302 acquires the current date through use of, for example, a timer included in the controller 300, and determines whether or not the current date is on or later than the day following the date on which the previous processing was performed (Step S107). When the current date is not on or later than the day following the date on which the previous processing was performed (N in Step S107), the usage amount detector 302 brings the processing to an end. When the current date is on or later than the day following the date on which the previous processing was performed (Y in Step S107), the usage amount detector 302 notifies the prediction unit 305 of the cumulative toner usage amount $U_T$ as an "amount of toner used on one day including the current time T" (toner usage amount per day). The usage amount detector 302 also notifies the prediction unit 305 of the remaining toner amount $W_T$ (Step S108). After the notification, the usage amount detector 302 initializes the cumulative toner usage amount $U_T$ to 0 (Step S109). That is, the usage amount detector 302 notifies the prediction unit 305 of the toner usage amount per day once a day. Then, the processing of the usage amount detector 302 is brought to an end.

Figure 5:
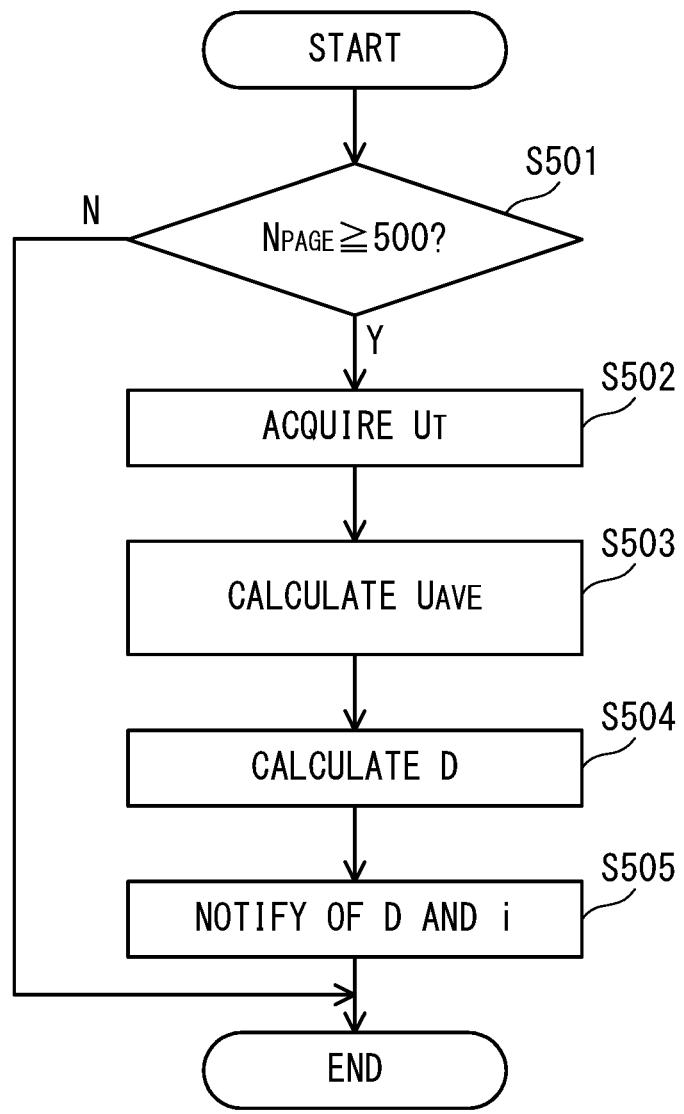
FIG. 5 is a flow chart for illustrating an operation of a prediction unit.

FIG. 5 is a flow chart for illustrating the operation of the prediction unit 305. The prediction unit 305 executes processing illustrated in FIG. 5 at a timing at which the prediction unit 305 is notified of the cumulative toner usage amount $U_T$ from the usage amount detector 302.

The prediction unit 305 performs a comparison between the cumulative output number $N_{PAGE}$ acquired from the image controller 301 and a predetermined number-of-sheet threshold value (Step S501). In at least one embodiment, the number-of-sheet threshold value is set to 500. When the cumulative output number $N_{PAGE}$ is smaller than the number-of-sheet threshold value (N in Step S501), the prediction unit 305 determines that a condition for the computation is not satisfied, and brings the processing to an end. When the cumulative output number $N_{PAGE}$ is equal to or larger than the number-of-sheet threshold value (Y in Step S501), the prediction unit 305 acquires the cumulative toner usage amount $U_T$ from the usage amount detector 302 (Step S502). The prediction unit 305 calculates an average value $U_{AVE}$ (cumulative average of the toner usage amount per day) of the cumulative toner usage amount $U_T$ by the following expression through use of the acquired cumulative toner usage amount $U_T$ (Step S503).

$$U_{AVE} = \frac{\sum_{n=1}^{i} U_n}{i}$$

In the above-mentioned expression, "i" represents the number of times that the "toner usage amount per day" is acquired from the usage amount detector 302, and "$U_n$" represents the toner usage amount per day at the time of the n-th notification. That is, the number i of times of acquisition corresponds to the number of days on which the user's past usage history was acquired. The average value $U_{AVE}$ is set to 0 while the "toner usage amount per day" is never used to calculate the average value $U_{AVE}$ of the cumulative toner usage amount.

The prediction unit 305 calculates the number D of remaining days as a period that allows the use of the toner currently remaining in the image forming apparatus 101 based on the average value $U_{AVE}$ of the cumulative toner usage amount and the remaining toner amount $W_T$ acquired from the usage amount detector 302 (Step S504). The number D of remaining days is calculated by the following expression: $D=W_T/U_{AVE}$. The expression for calculating the number D of remaining days functions as an estimation model for estimating a future change in remaining amount of the consumable. When the average value $U_{AVE}$ is 0, the number D of remaining days is set to a sufficiently large value, for example, 9,999 days. The prediction unit 305 notifies the determination unit 306 of the calculated number D of remaining days and the number i of times of acquisition (Step S505). Then, the processing of the prediction unit 305 is brought to an end. The number D of remaining days is an example of information relating to a replacement timing at which the consumable is to be replaced.

Figure 6:
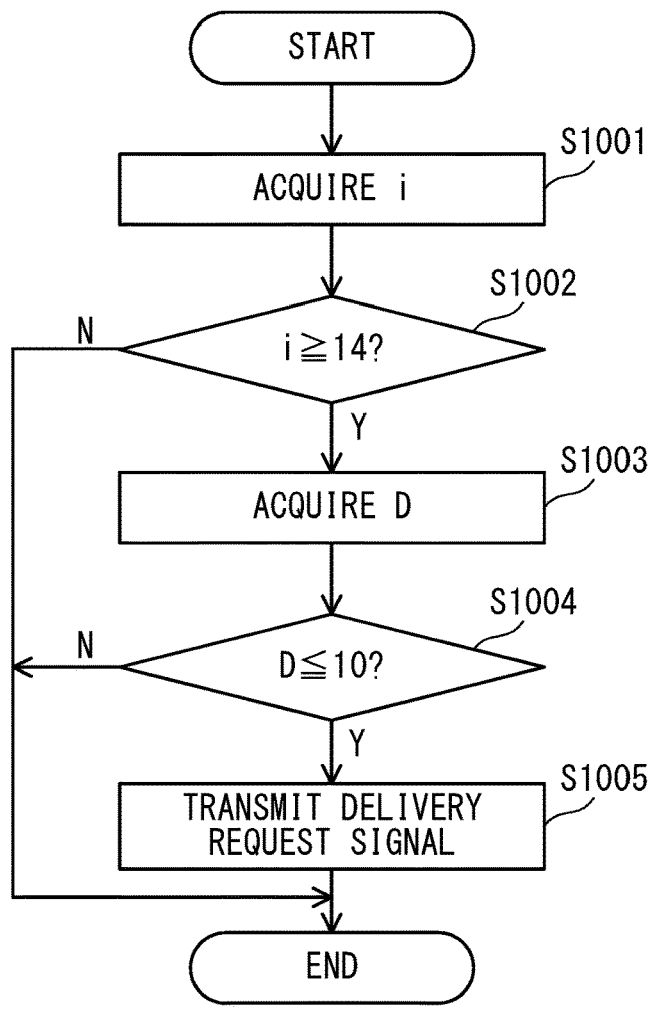
FIG. 6 is a flow chart for illustrating an operation of a determination unit.

FIG. 6 is a flow chart for illustrating the operation of the determination unit 306. The determination unit 306 acquires the number i of times of acquisition output from the prediction unit 305 (Step S1001). The determination unit 306 determines whether or not the acquired number i of times of acquisition is equal to or larger than a predetermined number-of-day threshold value (for example, value corresponding to 14 days or longer) (Step S1002). When the number i of times of acquisition is smaller than the number-of-day threshold value (N in Step S1002), the determination unit 306 brings the processing to an end.

When the number i of times of acquisition is equal to or larger than the number-of-day threshold value (Y in Step S1002), the determination unit 306 acquires the number D of remaining days output from the prediction unit 305 (Step S1003). The determination unit 306 determines whether or not the acquired number D of remaining days is equal to or smaller than a predetermined delivery threshold value (for example, value corresponding to 10 days or shorter) (Step S1004). When the number D of remaining days is larger than the delivery threshold value (N in Step S1004), the determination unit 306 brings the processing to an end. When the number D of remaining days is equal to or smaller the delivery threshold value (Y in Step S1004), the determination unit 306 determines that the toner bottle 140 is soon to be used up and become empty. In this case, the determination unit 306 generates a delivery request signal for prompting a "delivery request", which is an example of a request for preparation of a toner bottle for replacement. The delivery request signal corresponds to a signal for requesting to place an order. The determination unit 306 transmits the generated delivery request signal to the display controller 310 as well as to the external maintenance server 307 through the communication unit 308 (Step S1005). The display controller 310 avoids displaying the number of remaining days on the display of the operation panel 171 until a predetermined number of days passes since the day on which the image forming apparatus 101 is installed.

Figure 7:
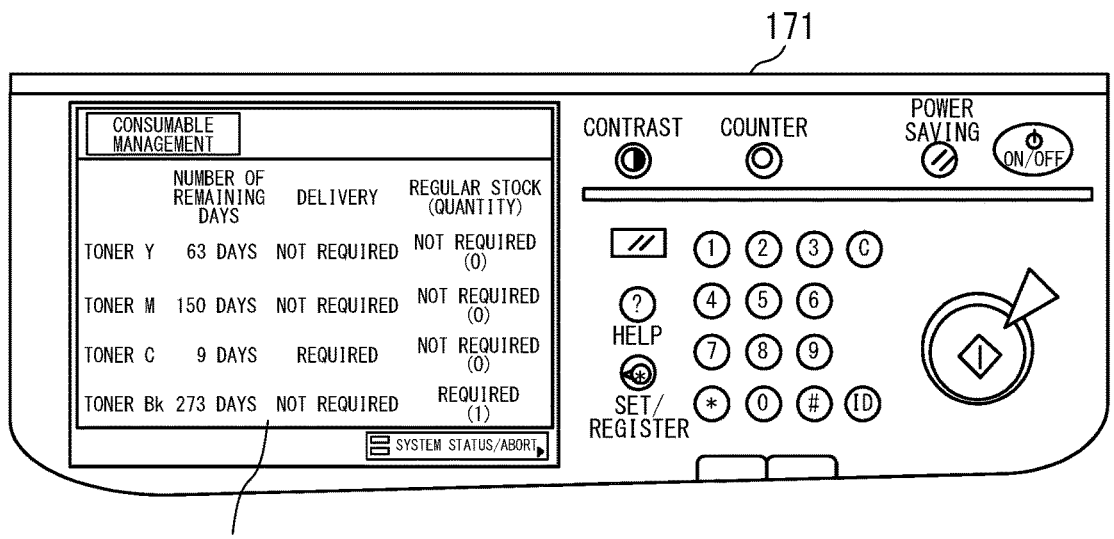
FIG. 7 is a view for illustrating an example of a screen corresponding to a delivery request signal.

The display controller 310 performs display control of the display included in the operation panel 171. The display controller 310 displays on the display a screen corresponding to the delivery request signal acquired from the determination unit 306. FIG. 7 is a view for illustrating an example of a screen corresponding to the delivery request signal displayed on the operation panel 171. On the display screen 600 of the operation panel 171, a list of toners (toner Y, toner M, toner C, and toner K) included in the image forming apparatus 101 is displayed in regard to the number D of remaining days and whether or not the toner bottle is required to be delivered. The item "whether or not the toner bottle is required to be delivered" is set to "required" for the toner bottle for which the display controller 310 has received a delivery request signal, and is set to "not required" for the toner bottle for which the display controller 310 has not received a delivery request signal.

The maintenance server 307 displays an image on a predetermined display in response to the delivery request signal acquired from the determination unit 306 through the communication unit 308. Information to be displayed is, for example, the same as that of the screen illustrated in FIG. 7, and includes the item "whether or not the toner bottle is required to be delivered" for each toner. When the maintenance server 307 displays such a screen, an operator of the maintenance server 307 is allowed to view the displayed information to examine whether or not the delivery of a toner bottle is required to be arranged for replacement or regular stock (as well as the quantity of delivery). This allows the toner bottle for replacement to be delivered to an installation place of the image forming apparatus 101 at an appropriate timing.

In the above description, the image forming apparatus 101 sets a result of performing a comparison between the cumulative output number $N_{PAGE}$ and the predetermined number-of-sheet threshold value by the prediction unit 305 as a first computation stopping condition (processing of Step S501 illustrated in FIG. 5). In addition, the image forming apparatus 101 sets a result of performing a comparison between the number i of times of acquisition and the number-of-day threshold value by the determination unit 306 as a second computation stopping condition (processing of Step S1002 illustrated in FIG. 6).

The first calculation stop condition is a condition for preventing the user's usage history from being used for a future demand forecast during a period after the installation of the image forming apparatus 101 until a predetermined number of sheets S on which images have been formed are output. When the first computation stopping condition is satisfied (N in Step S501), the prediction unit 305 avoids performing the processing. Therefore, even when a different amount of image formation is performed in an initial stage of the installation of the image forming apparatus 101, it is possible to suppress any errors caused in the subsequent demand forecasts by a state exhibited at this time.

The second computation stopping condition is a condition for preventing the number of remaining days from being updated and the delivery request signal from being generated until a predetermined number of data items are acquired after the acquisition of the user's usage history data is started. When the second computation stopping condition is satisfied (N in Step S1002), the determination unit 306 avoids performing the processing. The second computation stopping condition allows the image forming apparatus 101 to suppress an influence of the error exerted on the determination of whether or not to generate the delivery request signal even when one usage history data item that has been newly obtained includes a large number of errors expected to exert influences on the long-term future demand forecast.

Modification Example

Figure 8:
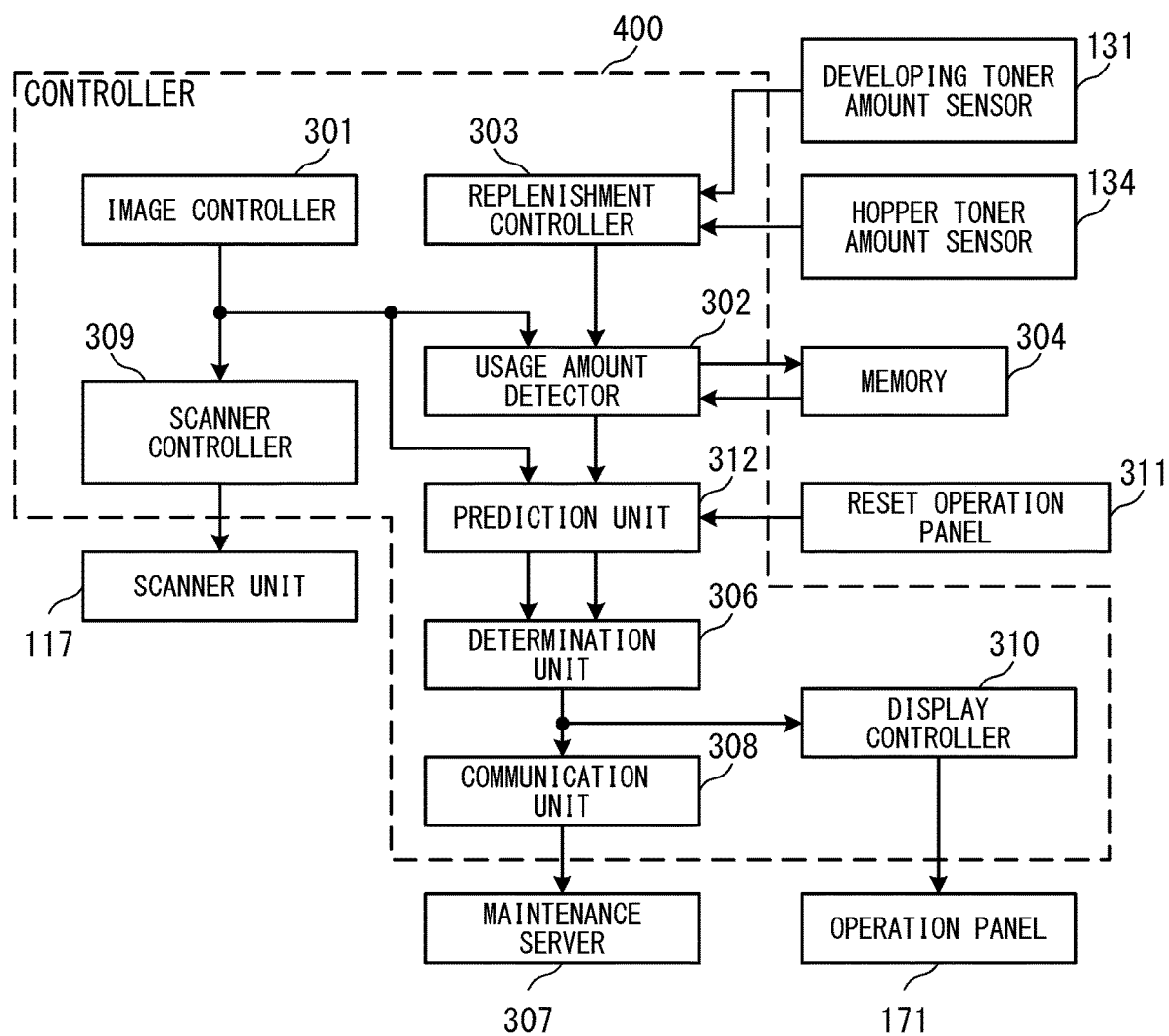
FIG. 8 is an explanatory diagram of a modification example of a controller.

A case in which the consumable is toner (toner bottle) is described in a modification example as well. FIG. 8 is an explanatory diagram of the modification example of a controller for managing the delivery of a consumable to be used by the image forming apparatus 101 at the time of image formation. The configuration itself of a controller 400 is the same as that of the controller 300 illustrated in FIG. 3, but the operation of a prediction unit 312 is different from that of the prediction unit 305 of the controller 300 illustrated in FIG. 3. The controller 400 functions as an information processing apparatus. The prediction unit 312 is connected to a reset operation panel 311. In addition, the prediction unit 312 acquires the image pixel information from the image controller 301. Other configurations and operations are as described above.

The reset operation panel 311 transmits a reset signal to the prediction unit 312 by being operated by the user. The reset operation panel 311 may be integrated with the operation panel 171, or may be provided as a separate part.

Figure 9:
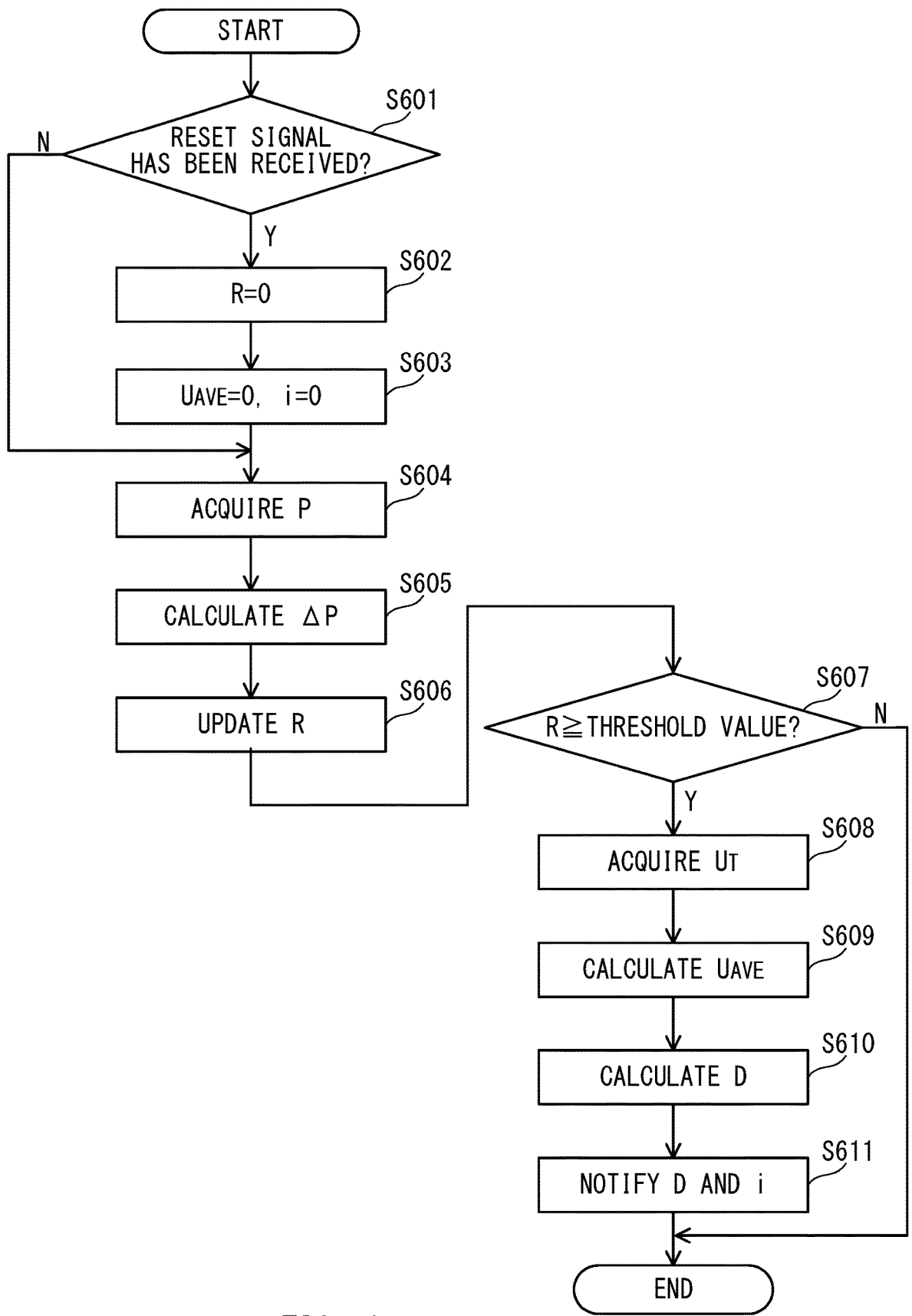
FIG. 9 is a flow chart for illustrating an operation of the prediction unit.

FIG. 9 is a flow chart for illustrating the operation of the prediction unit 312. The prediction unit 312 executes processing illustrated in FIG. 9 at a timing at which the prediction unit 312 is notified of the cumulative toner usage amount $U_T$ from the usage amount detector 302.

The prediction unit 312 determines whether or not a reset signal has been received from the reset operation panel 311 (Step S601). When the reset signal has been received (Y in Step S601), the prediction unit 312 resets a cumulative pixel R, which is a cumulative value of the image pixel information P, to 0 (Step S602). The cumulative pixel R has an initial value set to 0 at the time of the production of the image forming apparatus 101. The prediction unit 312 resets the average value $U_{AVE}$ of the cumulative toner usage amount and the number i of times of acquisition to 0 (Step S603). That is, the prediction unit 312 handles, as the data acquired for the first time (i=1), the cumulative toner usage amount $U_T$ acquired from the usage amount detector 302 for the first time after that.

When the reset signal has not been received (N in Step S601), or after the cumulative pixel R, the average value $U_{AVE}$, and the number i of times of acquisition are reset, the prediction unit 312 acquires the image pixel information P from the image controller 301 (Step S604). The prediction unit 312 calculates an increment ΔP of the image pixel information P from the timing of the previous processing (Step S605), and updates the cumulative pixel R by adding the increment ΔP to the cumulative pixel R at the end time point of the previous processing (Step S606). The prediction unit 312 determines whether or not the updated cumulative pixel R is equal to or larger than a predetermined pixel threshold value (Step S607). When the cumulative pixel R is not equal to or larger than the pixel threshold value (N in Step S607), the prediction unit 312 brings the processing to an end. When the cumulative pixel R is equal to or larger than the pixel threshold value (Y in Step S607), the prediction unit 312 executes the processing from Step S608 to Step S611. The processing from Step S608 to Step S611 is the same as the processing from Step S502 to Step S505 illustrated in FIG. 5, and hence a description thereof is omitted.

The reset operation panel 311 is operated when, for example, the installation place of the image forming apparatus 101 is moved and a change in long-term future demand is expected. When a reset signal is input, the usage history stored so far is reset, which allows the controller 400 to predict the future demand after the movement of the installation place irrespective of the usage history.

The various numerical values used in the above description are merely examples, and the present disclosure is not limited to the above-mentioned numerical values. In addition, in the above description, the usage amount detector 302 calculates the estimated usage amount Q from the image pixel information P and the toner replenishment count N, but the toner usage amount may be detected by another method. For example, the usage amount detector 302 may calculate the estimated usage amount Q from a detection result obtained by a sensor configured to detect the volume and the weight of the toner contained in the toner bottle 140. In addition, the present disclosure can be applied to not only the image forming apparatus 101 but also any apparatus configured to operate through use of a consumable.

In this manner, the image forming apparatus 101 avoids performing the processing for outputting a delivery request signal for the consumable while at least one of the first computation stopping condition and the second computation stopping condition is satisfied. That is, the image forming apparatus 101 avoids issuing a delivery request for a consumable after the start of the use of the consumable until a predetermined condition is satisfied. For that reason, an error in the delivery timing is suppressed to issue a delivery request for a spare consumable at an appropriate timing, and it is possible to shorten a period for inventory management of the newly delivered consumable.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-239882, filed Dec. 21, 2018 which is hereby incorporated by reference herein in its entirety.

What is claimed is:

1. An information processing apparatus, which controls an image forming apparatus configured to form an image by using toner supplied from a toner container mounted onto the image forming apparatus, wherein the information processing apparatus comprises:
    an acquiring unit configured to acquire consumption data related to a toner consumption amount of the image forming apparatus;
    a controller configured to perform a first step, a second step, and a third step in this order, wherein:
        in the first step, the controller does not compute the number of remaining days until a predicted date of replacement of the toner container mounted onto the image forming apparatus based on the consumption data acquired by the acquiring unit;
        in the second step, the controller computes the number of remaining days based on the consumption data acquired by the acquiring unit without outputting the remaining days to a display; and
        in the third step, the controller computes the number of remaining days based on the consumption data acquired by the acquiring unit with outputting the computed number of remaining days to the display.

2. The information processing apparatus according to claim 1, wherein the controller is configured to output a signal for requesting a toner container based on the remaining days.

3. The information processing apparatus according to claim 1, wherein the controller is configured to:
    acquire remaining data relating to remaining amount of toner in the toner container mounted onto the image forming apparatus;
    generate a model representing a consumption tendency of the toner based on the consumption data; and
    compute the remaining days based on the remaining data and the model.

4. The information processing apparatus according to claim 1, further comprising a timer,
wherein the acquiring unit acquires the consumption data at different timings based on a result of counting time by the timer.

5. The information processing apparatus according to claim 1,
wherein the controller is configured to start the second step after the first step that is related to a number of sheets on which images are formed by the image forming apparatus is satisfied.

6. The information processing apparatus according to claim 1,
wherein the controller is configured to start the third step in a case where the second step that is related to passed days is satisfied.

7. A control method for an image forming apparatus configured to form an image by using toner supplied from a toner container mounted onto the image forming apparatus, the control method comprising:
acquiring consumption data relating to a toner consumption amount of the image forming apparatus; and
performing a first step, a second step, and a third step in this order, wherein:
in the first step, the number of remaining days until a predicted date of replacement of the toner container mounted onto the image forming apparatus is not computed based on the acquired consumption data;
in the second step, the number of remaining days is computed based on the acquired consumption data without outputting the remaining days to a display; and
in the third step, the number of remaining days is computed based on the acquired consumption data with outputting the computed number of remaining days to the display.

8. The control method for an image forming apparatus according to claim 7,
wherein the second step further includes:
acquiring remaining data relating to remaining amount of toner in the toner container mounted onto the image forming apparatus;
generating a model representing consumption tendency of the toner based on the consumption data; and
computing the remaining days based on the remaining data and the model.

9. The control method for an image forming apparatus according to claim 7, further comprising:
outputting a signal for requesting a toner container based on the remaining days.

10. The control method for an image forming apparatus according to claim 7,
wherein the second step is started after the first step that is related to a number of sheets on which images are formed by the image forming apparatus is satisfied.

11. The control method for an image forming apparatus according to claim 7, wherein
the third step is started in a case where the second step that is related to passed days is satisfied.

12. An image forming apparatus that forms an image by using toner supplied from a toner container mounted onto the image forming apparatus, the image forming apparatus comprising:
an acquiring unit configured to acquire consumption data related to a toner consumption amount of the image forming apparatus;
a controller configured to perform a first step, a second step, and a third step in this order, wherein:
in the first step, the controller does not compute the number of remaining days until a predicted date of replacement of the toner container mounted onto the image forming apparatus based on the consumption data acquired by the acquiring unit;
in the second step, the controller computes the number of remaining days based on the consumption data acquired by the acquiring unit without outputting the remaining days to a display;
in the third step, the controller computes the number of remaining days based on the consumption data acquired by the acquiring unit with outputting the computed number of remaining days to the display.

13. The image forming apparatus according to claim 12, wherein the controller outputs a signal for requesting a toner container based on the remaining days.

14. The image forming apparatus according to claim 12, wherein the controller is configured to:
acquire remaining data relating to remaining amount of toner in the mounted toner container;
generate a model representing consumption tendency of the toner based on the consumption data; and
compute the remaining days based on the remaining data and the model.

15. The image forming apparatus according to claim 12, the controller is configured to start the second step after the first step that is related to a number of sheets on which images are formed by the image forming apparatus is satisfied.

16. The image forming apparatus according to claim 12, the controller is configured to start the third step in a case where the second step that is related to passed days is satisfied.

* * * * *